United States Patent
Choi et al.

(10) Patent No.: US 12,512,979 B2
(45) Date of Patent: Dec. 30, 2025

(54) SECURITY METHOD OF INPUT DATA USING RANDOM NUMBER DATA FOR SECURITY KEYPAD

(71) Applicant: LOCKIN COMPANY CO., LTD., Seongnam-si (KR)

(72) Inventors: Myoung Kyu Choi, Seongnam-si (KR); Myung Hoon Pyo, Incheon (KR)

(73) Assignee: LOCKIN COMPANY CO., LTD., Seongnam-si (KR)

( * ) Notice: Subject to any disclaimer, the term of this patent is extended or adjusted under 35 U.S.C. 154(b) by 104 days.

(21) Appl. No.: 18/573,870

(22) PCT Filed: Oct. 24, 2023

(86) PCT No.: PCT/KR2023/016587
§ 371 (c)(1),
(2) Date: Dec. 22, 2023

(87) PCT Pub. No.: WO2025/009666
PCT Pub. Date: Jan. 9, 2025

(65) Prior Publication Data
US 2025/0055679 A1    Feb. 13, 2025

(30) Foreign Application Priority Data
Jul. 4, 2023    (KR) .......................... 10-2023-0086617

(51) Int. Cl.
*H04L 9/40*    (2022.01)
*H04L 9/08*    (2006.01)
*H04L 9/32*    (2006.01)

(52) U.S. Cl.
CPC .......... *H04L 9/0869* (2013.01); *H04L 9/3228* (2013.01)

(58) Field of Classification Search
CPC ....... H04L 9/0869; H04L 9/3228; H04L 9/06; H04L 9/08; H04L 9/0643; H04L 9/0863; G06F 21/83; G06F 7/58
See application file for complete search history.

(56) References Cited

U.S. PATENT DOCUMENTS

| | | | |
|---|---|---|---|
| 2002/0016918 A1* | 2/2002 | Tucker | G06F 21/602 380/42 |
| 2009/0066543 A1* | 3/2009 | Delia | G06F 21/85 341/23 |
| 2017/0337551 A1* | 11/2017 | Lee | H04L 9/0869 |
| 2019/0080061 A1* | 3/2019 | Baek | G06F 21/45 |

* cited by examiner

*Primary Examiner* — Thaddeus J Plecha
(74) *Attorney, Agent, or Firm* — Seed Intellectual Property Law Group LLP

(57) ABSTRACT

A method of securing input data using random number data for a security keypad according to the present invention includes (a) a step of generating randomly server random number data by a main server, (b) a step of generating, by a client, client random number data corresponding to each input character input through a security keypad from a random number table generated by using the server random number data, and (c) a step of generating, by the main server, final random number data and a final random number table by using the client random number data, and extracting and generating plain text data from the final random number table.

10 Claims, 4 Drawing Sheets

SECURITY METHOD OF INPUT DATA USING RANDOM NUMBER DATA FOR SECURITY KEYPAD

RELATED APPLICATIONS

This application is a national entry of PCT International Patent Application No. PCT/KR2023/016587 for "A SECURITY METHOD OF INPUT DATA USING RANDOM NUMBER DATA FOR SECURITY KEYPAD" naming Myoung Kyu CHOI as first inventor, filed Oct. 24, 2023 in the name of "LOCKIN COMPANY CO., LTD." which PCT application claims the benefit of priority of Korean Patent Application Serial No. 10-2023-0086617, filed Jul. 4, 2023 in the name of "LOCKIN COMPANY CO., LTD.". The entire contents of the above-referenced applications and of all priority documents referenced in the Application Data Sheet filed herewith are hereby incorporated by reference for all purposes.

TECHNICAL FIELD

The present invention relates to a method of securing input data using random number data for a security keypad, and more specifically, to a method of securing input data using random number data for a security keypad which strengthens the security of input characters input through a security keypad by using random number data generated by changing each time.

BACKGROUND

In the modern information society, there are various information devices, such as personal computers, smartphones, tablet computers, and automated financial terminals. Most of the information devices each include an input unit to receive information from a user, and the use of virtual keypads as input units has been increasing. In general, in online banking using a computer or smart phone, a virtual keypad is displayed on a screen, and personal information, such as account password or security card number, can be is input through a mouse or touch screen.

In addition, more sophisticated and advanced security threats, such as malware that carries out intelligent and continuous threatening attacks, are increasing. In particular, when users use financial services, such as internet banking that require keyboard input information at the time of inputting a password, keylogger attacks, which store and leak input information without a user's permission, also frequently occur. As a result, research on virtual keypads with enhanced security is being actively conducted to prevent the keylogger.

In relation to such a virtual keypad, Korea Patent No. 10-1595794 (title of invention: Apparatus for generating virtual keypad with enhanced security function) has been disclosed.

However, because the above type of virtual keypad has multiple characters arranged in fixed positions, a third party could spy on or hack a user's touch location and find out the information input by a user. Also, when using a virtual keypad, the transmitted touch coordinate information can be obtained or touch events can be logged in the smartphone, and there was a limitation in that personal information, such as input passwords, can be leaked when the memory itself is hacked.

SUMMARY OF INVENTION

Technical Problem

An object of the present invention is to provide a method of securing input data using random number data for a security keypad that can increase greater security, which generates and manages a standardized secret key by extracting plain text data from a final random number table generated by using random number data of which size is randomly generated and changes every time.

Technical problems to be solved by the present invention are not limited to the technical problem described above, and other technical problems not described will be clearly understood by those skilled in the art from the descriptions below.

Solution to Problem

In order to achieve the object, a configuration of the present invention includes a method of securing input data using random number data for a security keypad, the method including (a) a step of generating randomly server random number data by a main server, (b) a step of generating, by a client, client random number data corresponding to each input character input through a security keypad from a random number table generated by using the server random number data; and (c) a step of generating, by the main server, final random number data and a final random number table by using the client random number data, and extracting and generating plain text data from the final random number table.

In the embodiment of the present invention, the step (a) includes (a1) a step of generating a one-time identification (OTID) which is a secure random value by the main server, (a2) a step of reading a salt value the main server; (a3) a step of generating, the main server, a base hash value for generating the server random number data by using the security random value and the salt value; (a4) a step of generating, by the main server, a random range value (R) to be matched to one character used in the security keypad; and (a5) a step of generating, by the main server, an N-th hash value by applying the base hash value to a hash function.

In the embodiment of the present invention, the step (a) further includes (a6) a step of storing the N-th hash value in the main server; and (a7) a step of determining, by the main server, whether generation of the server random number data is completed, and when the generation of the server random number data is not completed, the step (a7) includes (a71) a step of generating an (n+1)-th hash value, by the main server, by applying the N-th hash value to the hash function; and (a72) a step of returning to the step (a6), and after the step (a72), the main server stores the (n+1)-th hash value in the step (a6).

In the embodiment of the present invention, the step (a) includes (a8) a step of completing the generation of the server random number data; (a9) a step of transmitting the server random number data to the client by the main server, and (a10) a step of deleting the server random number data by the main server.

In the embodiment of the present invention, the step (b) includes (b1) a step of verifying, by the client, whether the server random number data conforms to a preset format after the client receives the server random number data transmitted from the main server; (b2) a step of generating, by the client, a random number table for matching the server random number data to the input character; (b3) a step of inputting, by a user, each input character through the security keypad by a user, (b4) a step of reading and storing, by the client, client random number data corresponding to each input character from the random number table; and (b5) a step of determining, by the client, whether an input of each input character is completed, and the step (b5) includes (b51) a step of returning to the step (b3) when the input of each input character is not completed.

In the embodiment of the present invention, the step (b) includes (b6) a step of completing generation of the client random number data; and (b7) a step of transmitting the client random number data to the main server by the client.

In the embodiment of the present invention, the step (c) includes (c1) a step of receiving, by the main server, the client random number data transmitted from the client and then verifying whether the client random number data is modulated; (c2) a step of generating, by the main server, the final random number data by using the client random number data; (c3) a step of generating, by the main server, the final random number table by using the final random number data; (c4) a step of extracting, by the main server, the plain text data through the final random number table; and (c5) a step of determining, by the main server, whether extraction of the plain text data is completed, and the step (c5) includes (c51) a step of returning to the step (c4) when extraction of the plain text data is not complete.

In the embodiment of the present invention, the step (c) further includes (c6) a step of completing generation of the plain text data.

In the embodiment of the present invention, the step (c2) includes (c21) a step of extracting and generating, by the main server, a final one-time identification (OTID), which is a final security random value, from the client random number data; (c22) a step of reading the salt value by the main server; (c23) a step of generating, by the main server, a final base hash value for generating the final random number data by using the final security random value and the salt value; (c24) a step of generating, by the main server, a final random range value (R) to be matched to one character used in the security keypad; (c25) a step of generating, by the main server, an N-th final hash value by applying the final base hash value to a hash function; (c26) a step of storing the N-th final hash value in the main server; and (c27) a step of determining, by the main server, whether generation of the final random number data is completed.

In the embodiment of the present invention, when generation of the final random number data is not completed, the step (c27) includes (c271) a step of generate, by the main server, an (n+1)-th final hash value by applying the final hash value to the hash function; and (c272) a step of returning to the step (c26), and after the step (c272), the main server stores the (n+1)-th final hash value in the step (c26).

Advantageous Effects

According to the present invention including the above configuration, plain text data is extracted from a final random number table generated by using randomly generated random number data of which size changes each time, and thus, there is no risk of hacking even when exposed and a standardized secret key is generated and managed to provide greater security.

Effects of the present invention are not limited to the effect described above and should be understood to include all effects that can be inferred from the configuration of the present invention described in the detailed description or claims of the present invention.

MODE FOR INVENTION

Figure 1:
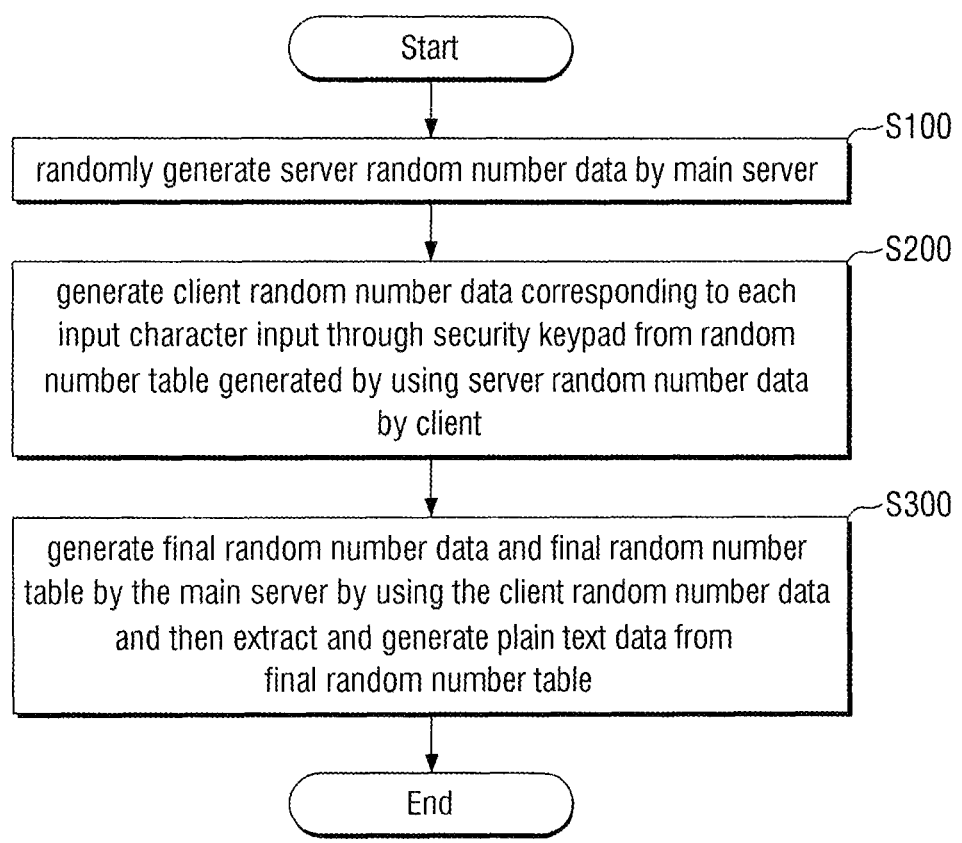
FIG. 1 is a flowchart illustrating a method of securing input data using random number data for a security keypad, according to an embodiment of the present invention.

Hereinafter, the present invention will be described with reference to the attached drawings. However, the present invention can be implemented in various different forms and accordingly, is not limited to the embodiments described herein. In order to clearly describe the present invention in the drawings, parts that are not related to the descriptions are omitted, and similar reference numerals are assigned to similar parts throughout the specification.

Throughout the specification, when a portion is said to be "connected (coupled, in contact with, combined)" to another portion, this is not only a case where the portion is "directly connected" thereto but also a case where the portion is "indirectly connected" thereto with another member therebetween. Also, when a portion is said to "include" a certain component, this does not mean that other components are excluded, but that other components can be added thereto, unless specifically stated to the contrary.

The terms used in the present specification are merely used to describe a certain embodiment and are not intended to limit the present invention. Singular expressions include plural expressions unless the context clearly dictates otherwise. In the present specification, terms, such as "include" or "have", are intended to indicate the presence of features, numbers, steps, operations, components, parts, or combinations thereof described in the specification, and should be understood that the terms do not exclude in advance the possibility of existence or addition of one or more other features, numbers, steps, operations, components, parts, or combinations thereof.

Hereinafter, embodiments of the present invention will be described in detail with reference to the attached drawings.

A "client" used throughout the specification refers to an application or service that can access a remote service of another computer system called a server through a network.

Specifically, a "client" is a program or system in which a server requests a service provided by the server in a client-server structure, and necessary parameters are provided for service request according to a method desired by the server, and which has a function of expressing the response returned from the server to a user in an appropriate manner.

FIG. 1 is a flowchart illustrating a method of securing input data using random number data for a security keypad, according to an embodiment of the present invention.

Referring to FIG. 1, a method of securing input data using random number data for a security keypad according to an embodiment of the present invention includes (a) a step of randomly generating server random number data by a main server (S100), (b) a step of generating client random number data corresponding to each input character input through a security keypad from a random number table generated by using server random number data (S200), and (c) a step of generating final random number data and a final random number table by using the client random number data and then extracting and generating plain text data from the final random number table by the main server (S300).

Figure 2:
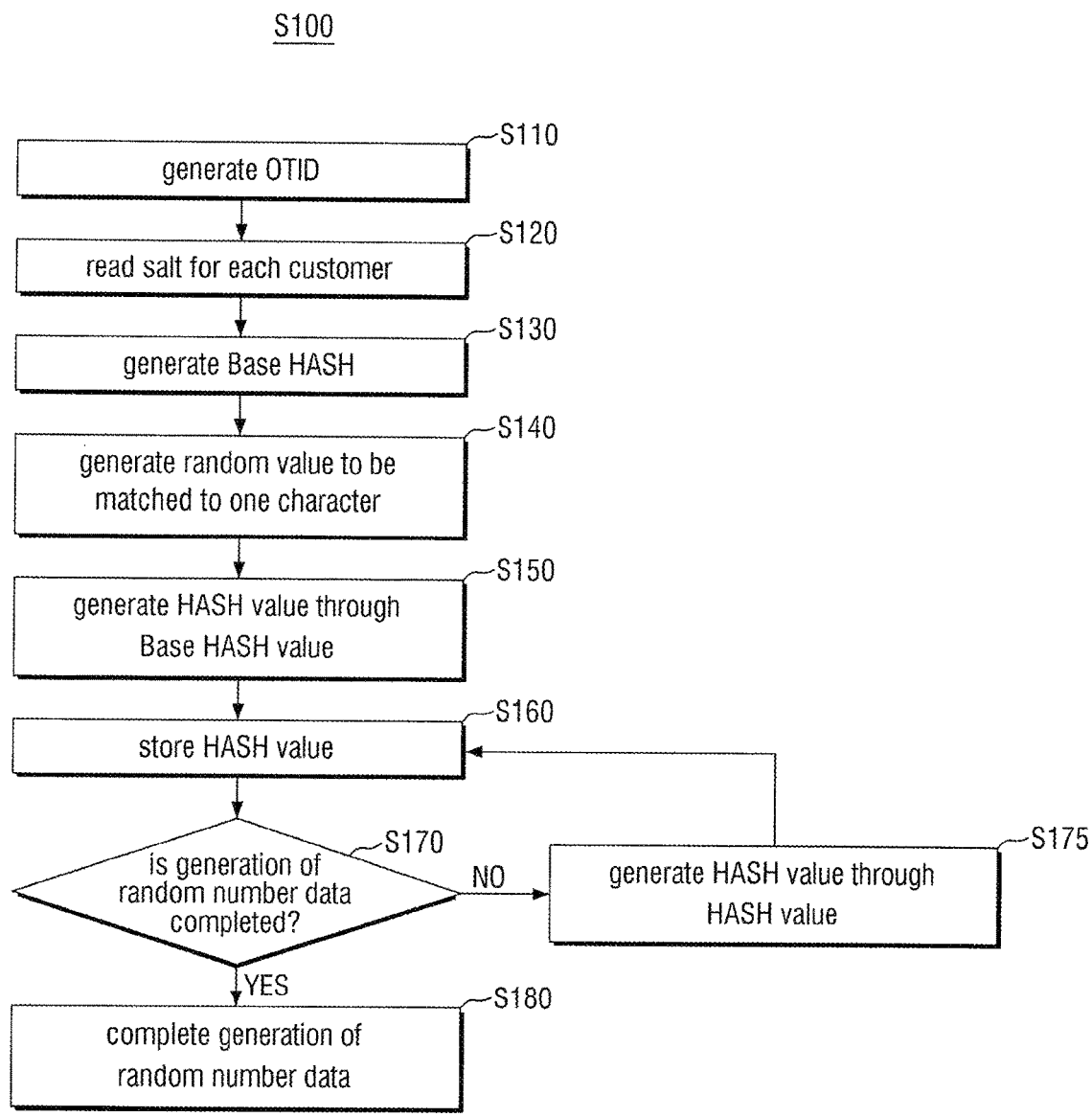
FIG. 2 is a flowchart details of step S100 of the method of securing input data using random number data for a security keypad, according to the embodiment of the present invention.

FIG. 2 is a flowchart illustrating details of step S100 of the method of securing input data using random number data for a security keypad according to the embodiment of the present invention.

Referring to FIG. 2, step (a) includes (a1) a step of generating, by the main server, a one-time identification (OTID) (S110), which is a secure random value, (a2) a step of reading a salt value by the main server (S120), (a3) a step of generating, by the main server, a base hash value for generating server random number data by using the security random value and salt value (S130), (a4) a step of generating, by the main server, a random range value (R) to be matched to one character used in the security keypad (S140), and (a5) a step of generating, by the main server, an N-th (where N is a natural number) hash value by applying the basic hash value to a hash function (S150).

In step (a1), when the generation of random number data is requested, the main server applies the random number generated by a random number generator to the hash function to generate a hash value to be used as the OTID.

Next, in step (a2), the main server reads the salt value from a license file issued to a customer (=client).

Next, in step (a3), the main server uses a hash value, which is generated by applying the security random value and salt value to a hash function, as the basic hash value.

Next, in step (a4), the main server generates the random range value (R) to be matched to one character used in a security keypad (a virtual keypad).

Here, the server random number data can be randomly generated within a range of a combination of 444 characters to 1776 characters.

While the conventional technology has a high risk of being hacked when exposed and is vulnerable to security because a method of generating, encrypting, and managing a standardized secret key is used, the present invention has an advantage in that the generated random number data is randomly changed in size and accordingly there is no risk of being hacked even when exposed. [5 Next, in step (a5), the main server applies the basic hash value to a hash function to generate the N-th hash value.

Referring to FIG. 2, step (a) further includes (a6) a step of storing the N-th hash value in the main server (S160) and (a7) a step of determining, by the main server, whether the generation of server random number data is completed (S170).

Specifically, referring to FIG. 2, step (a7) includes (a71) a step of generating, by the main server, an (n+1)-th hash value by applying the N-th hash value to the hash function when the generation of server random number data is not completed (S175), and (a72) a step of returning to step (a6), and after step (a72), the main server stores the (n+1)-th hash value in step (a6).

For example, after the first hash value (when N=1) is generated by applying the basic hash value generated in step (a5) to the hash function, the main server stores the first hash value in step (a6).

Next, the main server determines whether the generation of server random number data is completed in step (a7), and when the generation of server random number data is not completed, the main server generates a second hash value by applying first hash value to the hash function in step (a71), and returns from step (a72) to step (a6), and at this time, the main server stores the second hash value in step (a6), and a process of returning to step (a6) from step (a6) through step (a72) is a first cycle (a cycle order: step (a6)=>step (a7) =>step (a71)=>step (a72)=>step (a6)) (however, step (a5) is performed only once).

Next, also in a second cycle, the main server determines whether the generation of server random number data is completed in step (a7), and when the generation of server random number data is not completed, the main server generates a third hash value by applying the second hash value to the hash function in step (a71) and returns to step (a6) from step (a72), and at this time, in step (a6), the main server stores the third hash value, and a process of returning to step (a6) from step (a6) through step (a72) is the second cycle.

As described above, the main server repeats the above process until the generation of server random number data is completed.

Specifically, the main server puts the basic hash value into the hash function and generates a hash string (64 characters) (for example, when the generated hash string is called A, the main server puts A back into the hash function and generates another hash string, and when the generated hash string is called B, the main server puts B back into the hash function and generates another hash string).

The process described above as an example is repeated to generate a hash string, and the number of repetitions is determined to be greater than a hash value (random range value (R) generated in step (a4) maximum value (N) of keypad string/hash function) (for example, 64).

Accordingly, in step (a5) above, only the first hash value is generated.

In step (a6), the server random number data can be randomly generated within a range of a combination of 444 to 1776 characters.

Accordingly, in step (a7), the main server generates server random number data of R×N size by repeating the maximum value (N) of keypad string until the generation of server random number data to be used in the security keypad (=virtual keypad) is completed.

Next, the step (a) includes (a8) a step of completing the generation of server random number data, (a9) a step of generating, by the main server, the server random number data to a client, and (a10) a step of deleting random number data by the main server.

In particular, the server random number data is deleted in step (a10), which is to perform step (c) based on the client random number data obtained after step (b) is performed.

Figure 3:
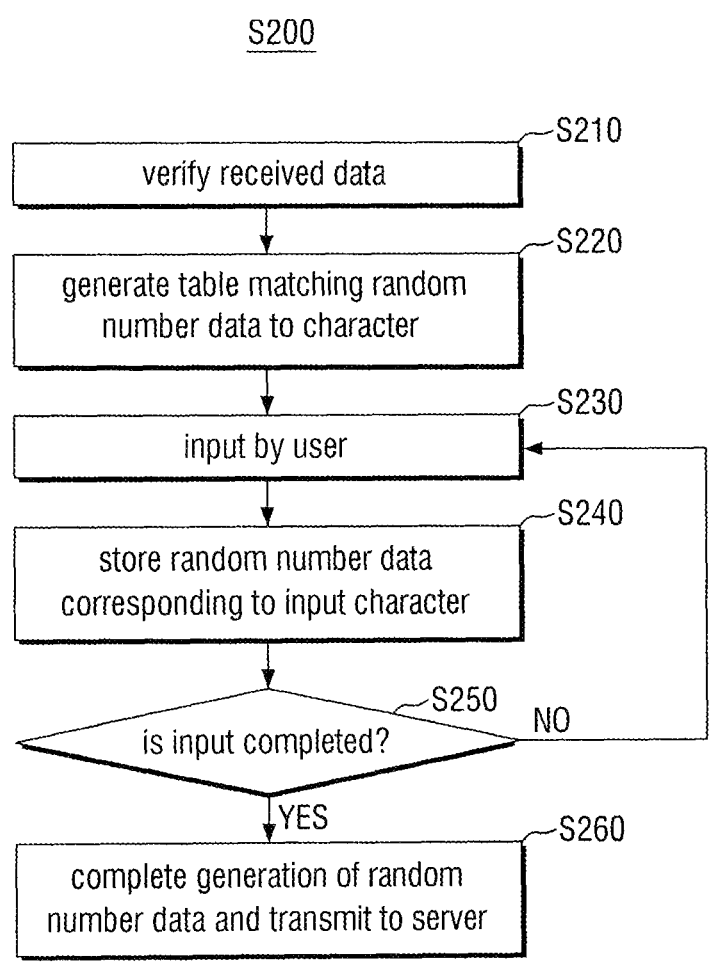
FIG. 3 is a flowchart illustrating details of step S200 of the method of securing input data using random number data for a security keypad, according to the embodiment of the present invention.

FIG. 3 is a flowchart illustrating details of step of the method of securing input data using random number data for a security keypad, according to the embodiment of the present invention (S200).

Referring to FIG. 3, step (b) includes (b1) a step of verifying whether server random number data conforms to a preset format after a client receives the server random number data transmitted from a main server (S210), (b2) a step of generating, by the client, a random number table to match server random number data to input characters (S220), (b3) a step of inputting each input character through a security keypad by the user (S230), (b4) a step of reading, by the client, client random number data corresponding to each input character from a random number table and storing the client random number data in the client (S240), and (b5) a step of determining, by the client, where the input of each input character is completed.

In step (b1), the client stores a program for verifying whether a preset format including a format, length, pattern, and so on of server random number data is previously stored and the server random number data conforms to the preset format.

Next, in step (b2), the client extracts a random range value (R) to be matched to one character from the server random number data, and retrieves one character from an array including all characters (=each input character) used in the security keypad (=virtual keypad) by using the R value, and matches one character to server random number data as long as R and stores the matched data in a random number table.

Accordingly, the client generates random number data by repeating the above process as many times as the maximum value (N) of keypad string.

Next, in step (b3), each input character is input through a security keypad (=virtual keypad) input by a user.

Next, in step (b4), the client matches one character among respective input characters to the corresponding client random number data and stores the matched data in the random number table.

In step (b5), the client determines whether the input of each input character is completed and performs following steps according to the determined result.

Specifically, step (b5) includes (b51) a step of returning to step (b3) when the input of each input character is not completed.

Referring to FIG. 3, step (b) further includes (b6) a step of completing the generation of client random number data (S260) and (b7) a step of transmitting, by the client, the client random number data to the main server (S270).

In step (b6) and step (b7), a user's input is completed, and the client random number data obtained in step (b6) and step (b7) is unmodulated data.

Figure 4:
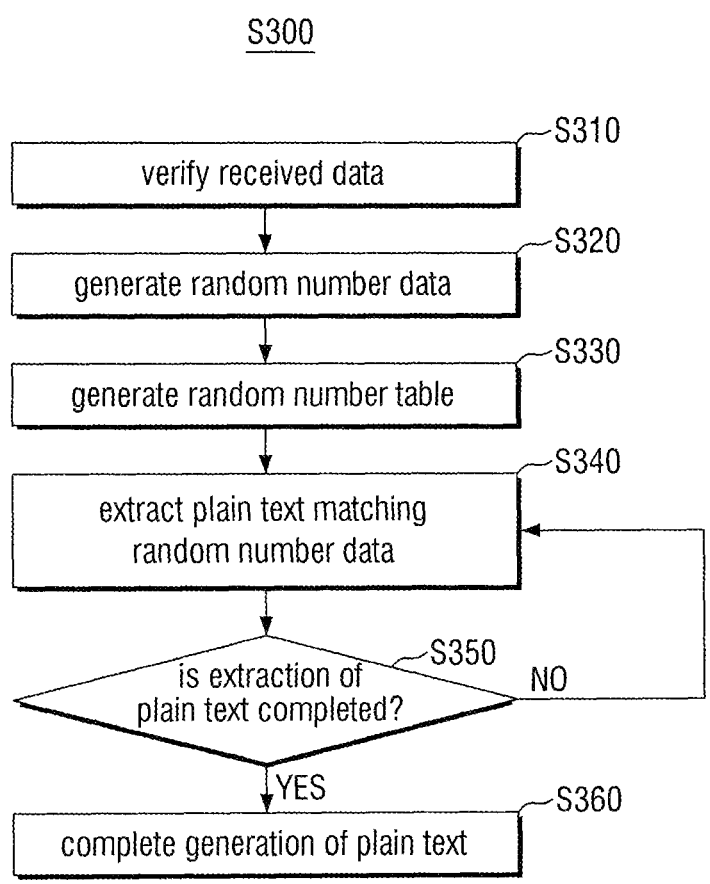
FIG. 4 is a flowchart illustrating details of step S300 of the method of securing input data using random number data for a security keypad, according to the embodiment of the present invention.

FIG. 4 is a flow chart illustrating details of step S300 of the method of securing input data using random number data for a security keypad, according to the embodiment of the present invention.

Referring to FIG. 4, step (c) includes (c1) a step of verifying, by a main server, whether client random number data is modulated, after receiving the client random number data transmitted from a client (S310), (c2) a step of generating, by the main server, final random number data by using the client random number data (S320), (c3) a step of generating, by the main server, a final random number table by using the final random number data (S330), (c4) a step of extracting, by the main server, plain text data through the final random number table, and (c5) a step, by the main server, whether the extraction of plain text data is completed.

In step (c1), the main server receives the client random number data transmitted from a client in a state where the server random number data is previously deleted in step (a10) described above, and then verifies whether the client random number data is modulated.

In this case, the main server stores a program for determining whether the client random number data is modulated.

Next, the step (c2) includes (c21) a step of extracting and generating, by the main server, a final OTID, which is a final security random value, from client random number data, (c22) a step of reading the salt value by the main server, (c23) a step of generating, by the main server, a final base hash value for generating final random number data by using a final security random value and a salt value, (c24) a step of generating, by the main server, a final random range value (R) to be matched to one character used in a security keypad, (c25) a step of generating, by the main server, the N-th final hash value by applying the final basic hash value to a hash function, (c26) a step of storing the N-th final hash value in the main server, and (c27) a step of determining, by the main server, whether the generation of final random number data is completed.

In step (c21), the main server extracts and generates the final OTID from the client random number data.

Next, in step (c22), the main server reads the salt value from a license file issued by a customer (=client).

Next, in step (c23), the main server uses a hash value, which is generated by applying the final security random value and salt value to the hash function, as the final base hash value.

Next, in step (c24), the main server generates a random range value (R) to be matched to one character used in the security keypad (=virtual keypad).

Here, the final random number data can be randomly generated in size within a range of a combination of 444 to 1776 characters, similar to step (a6).

Next, in step (c25), the main server applies the base hash value to the hash function to generate the N-th hash value.

Next, in step (c26), the main server stores the N-th hash value.

Next, in step (c27), when the generation of final random number data is not completed. (c271) a step of generating, by the main server, an (n+1)-th final hash value by applying the N-th final hash value to the hash function, and (c272) a step of returning to step (c26), and after step (c272), the main server stores the (n+1)-th final hash value in step (c26).

Here, the final random number data can be randomly generated in size within a range of a combination of 444 to 1776 characters.

In step (c27), the main server generates the final random number data of size of R×N by repeating a keypad string as many times as a maximum value (N) until the generation of the final random number data is completed.

Details of step (c2) are performed similarly to step (a) described above.

Next, in step (c3), the main server extracts a random range value (R) to be matched to one character from the client random number data, retrieves one character from an array including all characters used in the security keypad (=virtual keypad) by using the R value, and matches one character to final random number data as long as R and stores the matched data in a final random number table.

Step (c3) is performed similarly to step (b) described above.

Next, in step (c4), the main server extracts and generates plain text data for the client random number data from the final random number table.

Next, step (c5) includes (c51) a step of returning to step (c4) when extraction of the plain text data is not completed (S350).

Additionally, step (c) further includes step (c6) of completing the generation of the plain text data (S360).

The plain text data finally derived in this way is transferred to a customer to be utilized by the customer.

According to the present invention, unlike the related art which is vulnerable to security when exposed due to the use of a standardized secret key, random number data of different sizes can be randomly changed and generated, and thus, there is no need to generate and manage a separate secret key, and security can be strengthened.

Descriptions of the present invention described above are for illustrative purposes, and those skilled in the art to which the present invention pertains will be able to understand that the present invention can be easily transformed into another specific form without changing the technical idea or essential features of the present invention. Therefore, the embodiments described above should be understood as illustrative and not restrictive in all respects. For example, each component described as a single type can be implemented in a distributed manner, and similarly, components described as a distributed type can also be implemented in a combined form.

The scope of the present invention is indicated by the patent claims described below, and all changes or modifications derived from the meaning and scope of the patent claims and their equivalent concepts should be interpreted as being included in the scope of the present invention.

The invention claimed is:

1. A method of securing input data using random number data for a security keypad, the method comprising:
   (a) a step of generating randomly server random number data by a main server;
   (b) a step of generating, by a client, client random number data corresponding to each input character input through the security keypad from a random number table generated by using the server random number data; and
   (c) a step of generating, by the main server, final random number data and a final random number table by using the client random number data, and extracting and generating plain text data from the final random number table.

2. The method of claim 1, wherein the step (a) includes:
   (a1) a step of generating a one-time identification (OTID) which is a secure random value by the main server;
   (a2) a step of reading a salt value the main server;
   (a3) a step of generating, the main server, a base hash value for generating the server random number data by using the security secure random value and the salt value;
   (a4) a step of generating, by the main server, a random range value (R) to be matched to one character used in the security keypad; and
   (a5) a step of generating, by the main server, an N-th hash value by applying the base hash value to a hash function.

3. The method of claim 2, wherein the step (a) further includes:
   (a6) a step of storing the N-th hash value in the main server; and
   (a7) a step of determining, by the main server, whether generation of the server random number data is completed, and
   when the generation of the server random number data is not completed, the step (a7) includes:
   (a71) a step of generating an (n+1)-th hash value, by the main server, by applying the N-th hash value to the hash function; and
   (a72) a step of returning to the step (a6), and after the step (a72), the main server stores the (n+1)-th hash value in the step (a6).

4. The method of claim 3, wherein the step (a) includes:
   (a8) a step of completing the generation of the server random number data;
   (a9) a step of transmitting the server random number data to the client by the main server; and
   (a10) a step of deleting the server random number data by the main server.

5. The method of claim 1, wherein the step (b) includes:
   (b1) a step of verifying, by the client, whether the server random number data conforms to a preset format after the client receives the server random number data transmitted from the main server;
   (b2) a step of generating, by the client, the random number table for matching the server random number data to each input character;
   (b3) a step of inputting, by a user, each input character through the security keypad by a user;
   (b4) a step of reading and storing, by the client, the client random number data corresponding
   to each input character from the random number table; and
   (b5) a step of determining, by the client, whether an input of each input character is completed, and
   the step (b5) includes (b51) a step of returning to the step (b3) when the input of each input character is not completed.

6. The method of claim 5, wherein the step (b) includes:
   (b6) a step of completing generation of the client random number data; and
   (b7) a step of transmitting the client random number data to the main server by the client.

7. The method of claim 2, wherein the step (c) includes:
   (c1) a step of receiving, by the main server, the client random number data transmitted from the client and then verifying whether the client random number data is modulated;
   (c2) a step of generating, by the main server, the final random number data by using the client random number data;
   (c3) a step of generating, by the main server, the final random number table by using the final random number data;
   (c4) a step of extracting, by the main server, the plain text data through the final random number table; and
   (c5) a step of determining, by the main server, whether extraction of the plain text data is completed, and
   the step (c5) includes (c51) a step of returning to the step (c4) when extraction of the plain text data is not complete.

8. The method of claim 7, wherein the step (c) further includes (c6) a step of completing generation of the plain text data.

9. The method of claim 7, wherein the step (c2) includes:
   (c21) a step of extracting and generating, by the main server, a final one-time identification (OTID), which is a final security random value, from the client random number data;
   (c22) a step of reading the salt value by the main server;
   (c23) a step of generating, by the main server, a final base hash value for generating the final random number data by using the final security random value and the salt value;
   (c24) a step of generating, by the main server, a final random range value (R) to be matched to one character used in the security keypad;

(c25) a step of generating, by the main server, an N-th final hash value by applying the final base hash value to a hash function;

(c26) a step of storing the N-th final hash value in the main server; and (c27) a step of determining, by the main server, whether generation of the final random number data is completed.

10. The method of claim 9, wherein, when generation of the final random number data is not completed, the step (c27) includes:

(c271) a step of generate, by the main server, an (n+1)-th final hash value by applying the N-th final hash value to the hash function; and (c272) a step of returning to the step (c26), and after the step (c272), the main server stores the (n+1)-th final hash value in the step (c26).

* * * * *